No. 643,226. Patented Feb. 13, 1900.
W. H. JORDAN.
COIN CONTROLLED BEAM SCALE.
(Application filed Jan. 16, 1899.)

(No Model.) 3 Sheets—Sheet 1.

WITNESSES.
Matthew M. Blunt
C. M. Wilbur

INVENTOR.
Willis H. Jordan,
By O. M. Shaw
ATT'Y.

No. 643,226. Patented Feb. 13, 1900.
W. H. JORDAN.
COIN CONTROLLED BEAM SCALE.
(Application filed Jan. 16, 1899.)
(No Model.) 3 Sheets—Sheet 2.

WITNESSES.
Matthew M. Blunt
C. M. Wilbur

INVENTOR.
Willis H. Jordan.
By O. M. Shaw,
ATT'Y

No. 643,226. Patented Feb. 13, 1900.
W. H. JORDAN.
COIN CONTROLLED BEAM SCALE.
(Application filed Jan. 16, 1899.)

(No Model.) 3 Sheets—Sheet 3.

UNITED STATES PATENT OFFICE.

WILLIS H. JORDAN, OF BOSTON, MASSACHUSETTS, ASSIGNOR OF ONE-HALF TO OTIS M. SHAW, OF SAME PLACE.

COIN-CONTROLLED BEAM-SCALE.

SPECIFICATION forming part of Letters Patent No. 643,226, dated February 13, 1900.

Application filed January 16, 1899. Serial No. 702,211. (No model.)

*To all whom it may concern:*

Be it known that I, WILLIS H. JORDAN, of Boston, county of Suffolk, State of Massachusetts, have made certain new and useful Improvements in Coin-Controlled Beam-Scales, of which the following is a description sufficiently full, clear, and exact to enable any person skilled in the art or science to which said invention appertains to make and use the same, reference being had to the accompanying drawings, forming part of this specification, in which—

Figure 1:
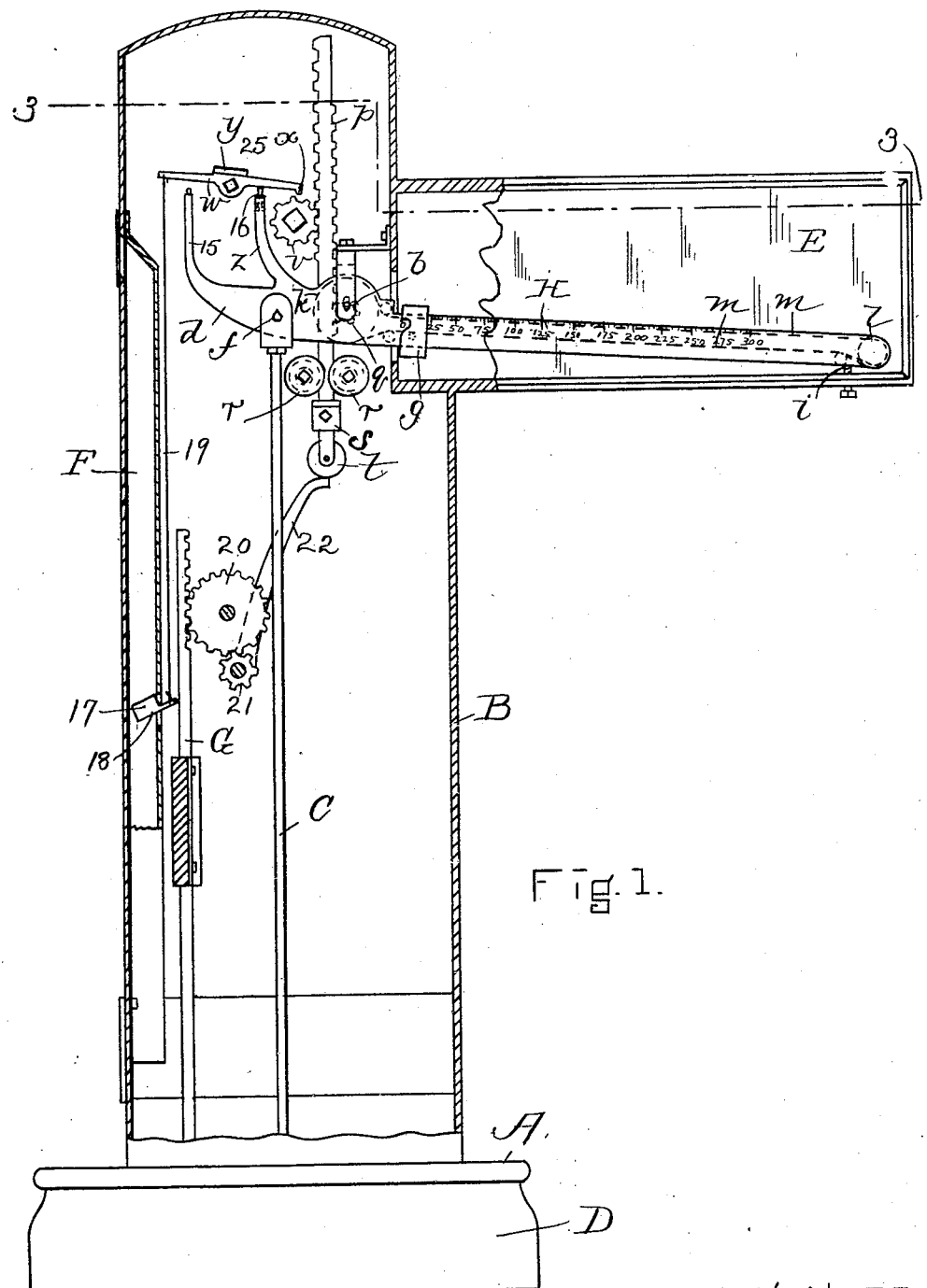
Figure 2:
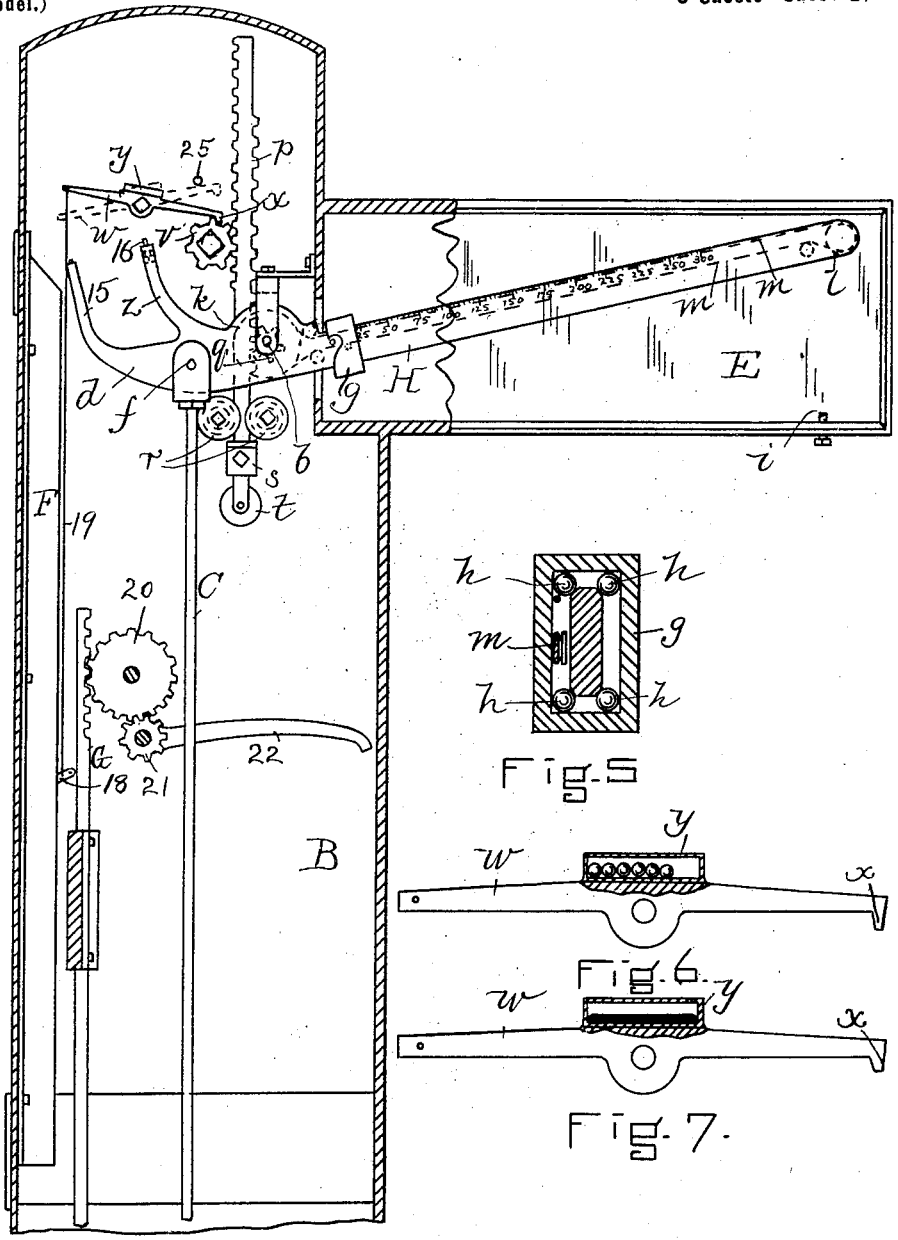
Figure 3:
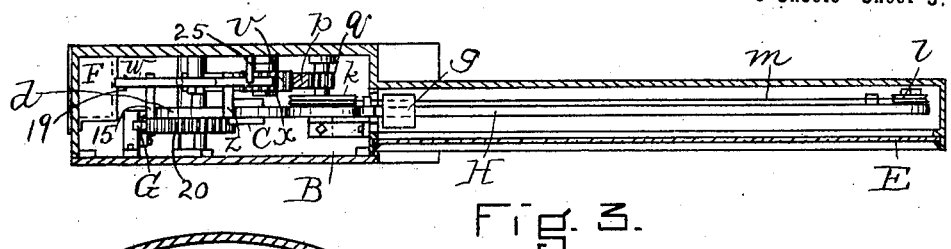
Figure 4:
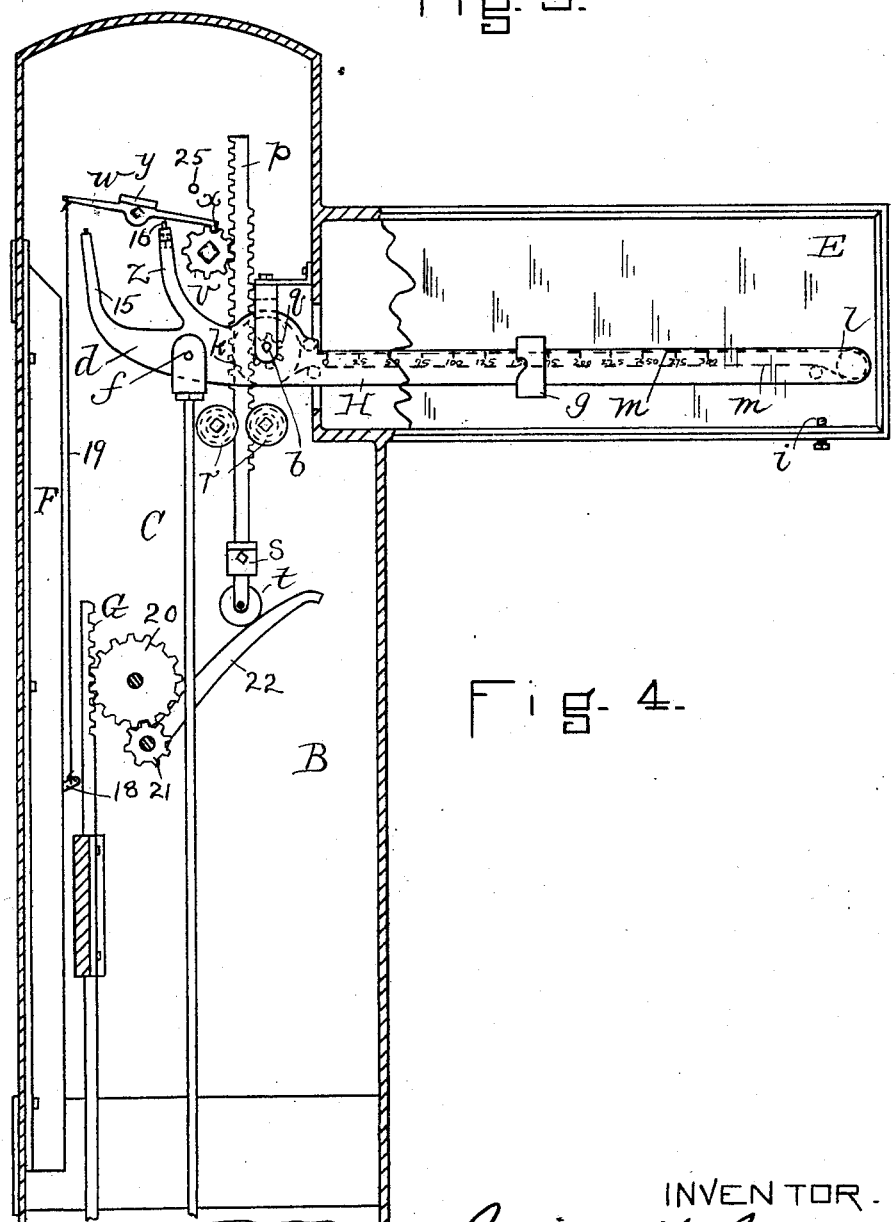

Figure 1 is an elevation showing a beam scale or mechanism to which my improved devices are applied, the case being broken away; Fig. 2, a like view showing the beam elevated and the parts in the positions first assumed when weight is applied to the platform; Fig. 3, a horizontal section on line 3 3 in Fig. 1, parts being shown in plan view; Fig. 4, an elevation similar to that shown in Fig. 2, the beam being balanced and the weight indicated; Fig. 5, a sectional view illustrating details of the beam-weight; and Figs. 6 and 7, views of the locking-lever, showing shifting weights.

Like letters and figures of reference indicate corresponding parts in the different figures of the drawings.

My invention relates especially to a coin released or controlled mechanism for automatically operating the balance-weight on the beam of an ordinary beam weighing-scale and locking the device when the weight applied has been accurately determined, whereby a greater or a less weight cannot be measured without the return of the parts to their normal positions and the application of another coin, the object being, particularly, to provide a coin-controlled weighing-scale of such accuracy that under existing laws it may be attested or sealed under government inspection, an indorsement which is refused the ordinary spring weighing-scale in many countries.

The nature and operation of my improved scale mechanism will be understood by those conversant with such matters from the following explanation.

In the drawings, A represents the platform, which rests upon the ordinary compound levers usual in scales of this class and to which the scale-rod C is connected in the ordinary manner. This construction being so well understood, it is not deemed essential to herein specifically illustrate or describe it.

The box-shaped standard B rises vertically from the rear of the base D, as is usual in scales of this class, but in this instance is somewhat larger or broader than the ordinary to accommodate the releasing mechanism.

The beam H is of the ordinary general construction and is fulcrumed in the standard B on the usual knife-edged bearing $b$, the connecting-rod C being similarly fulcrumed at $f$ in the short arm $d$ of said beam in the usual manner. The long arm of the beam is suitably spaced, forming a scale to meet the requirements of the mechanism, and the balance-weight $g$ slides thereon, as usual, said weight being provided interiorly with anti-friction-rollers $h$. The beam is inclosed in a glass casing E, on the lower wall or bottom of which there is an adjustable stop $i$, which limits the downward movement of said beam below the horizontal.

Concentric with the beam-fulcrum $b$ there is a loose pulley $k$, and on the outer end of the beam there is a pulley $l$ journaled, a cord $m$ connecting said pulleys and also being secured to the balance-weight $g$, whereby the position of the weight on said beam may be adjusted as the pulleys are operated.

A vertically-sliding rack-bar $p$ within the standard meshes with a pinion $q$ on the journal of the pulley $k$. Said rack passes between guide-rolls $r$, and adjustable weights $s$ are mounted on its lower end, where also an antifriction-roll $t$ is journaled. This rack-bar is toothed on both edges, and at the side opposite pinion $q$ it meshes with a stop-pinion $v$, journaled in the case. Pivoted adjacent to this pinion $v$ there is a dog $w$, the tooth $x$ of which may engage said pinion, locking it, and consequently the rack-bar $p$, against movement. This dog is shown in detail in Figs. 6 and 7. On its upper edge there is a tube $y$, equally disposed on either side its pivot, and in this tube is disposed a quantity of mercury or a series of balls to form a shifting weight for the dog for the purposes hereinafter specified.

On the short arm $d$ of the beam there is a vertical finger z, provided in its end with an adjustable point 16, which engages the tooth-arm of the dog w and normally holds said tooth out of engagement with the pinion v, the long arm of the beam being depressed, as in Fig. 1. The short beam-arm d is also equipped with another vertical finger 15, which at a determined point in the movement of the beam will engage the opposite arm of the dog w.

There is a vertical coin-chute F opening near the top of the case, and projecting into the path of the coin in said chute there is a pan 17, carried by a lever 18, pivoted in the case. A cord 19 connects this lever 18 with the dog w, so that when the pan is struck by a coin the dog is operated to release the locking-pinion v after being engaged therewith, as hereinafter described.

There is a vertically-moving rack-bar G within the standard carried by the platform A and which meshes with a gear 20. This gear 20 is meshed with a pinion 21, carrying a rigid radiating arm 22. This arm 22 projects across the path of the rack-bar p and is designed to engage the roll t of said bar and elevate it when rack G ascends upon the recovery of the platform A when weight is removed therefrom.

In the use of my improvement the beam-weight g being at zero on the scale-arm said arm is depressed and rests on stop i, as in Fig. 1. The finger z holds the dog-tooth out of contact with lock-pinion v, and so far the rack p is free to fall; but in this normal position of parts said rack is supported by the arm 22, as shown in Fig. 1. Weight now being applied to the platform A the fixed rack G is drawn down, thereby operating gears 20 and 21 and throwing arm 22 downward out of contact with rack p. Simultaneously the short arm of the beam H is drawn down by connecting-rod C and its scale-arm elevated above the horizontal to the position shown in Fig. 2. The dog w, freed by this movement of the beam H, follows finger z thereon, and its tooth instantly engages the pinion v, locking the rack p against falling, it being understood, as shown, that the dog is normally tilted slightly toward said pinion and the shifting weight in tube y being thus disposed on the corresponding side of the dog-pivot. The parts are now in the position shown in Fig. 2. The operator now inserts a coin in chute F, the impact of which with pan 17 actuates lever 18 and draws down the elevated arm of dog w, the shifting weight running to opposite side of its pivot and holding the toothed arm thus elevated in contact with a stop 25, arranged to limit its movement. Now immediately the rack p being thus freed falls, actuating the pulley k and driving the belt m. This draws the weight g outward on the scale-arm of the beam H, and said arm begins to descend toward the level in the ordinary manner of scales of this class. Just before said beam reaches the level, or when the slide g has advanced so far that the load on the platform is almost exactly balanced, the finger 15 strikes the depressed end of the dog a blow sufficiently hard to elevate it. Then the shifting weight crosses the pivot of the dog and depresses its tooth into the pinion v, instantly stopping the fall of the rack p. The beam is now balanced and the weight carried by the platform accurately indicated by the slide g on the scale-arm. It will of course be understood that when said beam is horizontal the finger z does not touch the dog w, said finger being of such length that the scale-arm must drop below the horizontal to effect this. By use of the shifting weight in tube y on the dog its movements are made positive and only a "kick" from finger 15, so slight as not to interfere with the weighing, is required. It will further be understood that when necessary the spacing on the scale-arm may be varied from the ordinary to compensate the applied mechanism and the scale give correct weights. The weight having been ascertained in manner described, as soon as it is removed from the platform the scale-arm H falls to stop i and the beam-finger z engages the dog and frees it from pinion v, thus releasing rack; but simultaneously the platform has ascended and carried with it the fixed rack G and engaged the rigid arm 22 with the roll t of the rack p. Said rack is thus driven upward, and by means of pulleys k l the slide-weight is drawn back to the zero on the scale-arm. The parts are again in the position shown in Fig. 1 and cannot be moved to indicate a weight on the beam until another coin is inserted.

It will be evident that as soon as a weight is ascertained by the leveling of the beam the actuating-rack is locked, and an additional weight applied to the platform would simply have the effect of elevating the scale-arm, while the slide-weight g would maintain its assumed position.

Having thus described my invention, what I claim is—

1. A beam-scale in combination with coin-controlled mechanism for automatically moving the slide-weight on said beam and locking said slide-weight when the beam balances.

2. A beam-scale in combination with coin-controlled mechanism for automatically moving the slide-weight on said beam and locking said slide-weight when the beam balances and releasing said slide-weight when the load is removed from said scale.

3. In a beam-scale a coin-released rack; a pulley actuated by the movement of said rack; the beam and its slide-weight and a connection between said pulley and weight.

4. In a beam-scale the beam and its slide-weight in combination with coin-released mechanism for automatically operating said weight; and a lock for said mechanism normally held released by said beam.

5. In a beam-scale a coin-controlled mechanism for operating the slide-weight thereof when the scale-arm of said beam is above the balance-level.

6. In a beam-scale the beam and its slide-weight in combination with coin-controlled mechanism for automatically operating said weight; and a lock for said mechanism normally held released by said beam.

7. In a beam-scale the beam and its slide-weight in combination with a rack and mechanism actuated by said rack for moving said slide-weight; and coin-controlled mechanism locking said rack when weight is applied to the scale-platform.

8. In a beam-scale the beam and its slide-weight in combination with a rack; mechanism actuated by said rack for moving said slide-weight; coin-controlled mechanism locking said rack when weight is applied to the scale-platform and releasing said rack through the action of a coin whereby the slide-weight may be automatically adjusted to balance the platform-weight.

9. In a beam-scale the beam and its slide-weight in combination with a rack and coin-released mechanism actuated by said rack for moving said slide-weight; and coin-controlled mechanism locking said rack when weight is applied to the scale-platform and releasing said mechanism when the weight is removed from said platform.

10. In a beam-scale the beam and its slide-weight in combination with a rack; coin-released mechanism actuated by said rack for moving said slide-weight; and mechanism actuated by a movement of the scale-platform for returning said rack.

11. In a beam-scale a mechanism for automatically moving the slide-weight of the scale-beam in combination with a coin-controlled locking device for said mechanism normally held released by said beam.

12. In a beam-scale a mechanism for automatically moving the slide-weight of the scale-beam in combination with a coin-controlled locking device for said mechanism actuated positively by a movement of said beam.

13. In a beam-scale a mechanism for automatically moving the slide-weight of the scale-beam in combination with a coin-controlled locking device for said mechanism normally held released by said beam and actuated positively by a movement of said beam to lock said mechanism.

14. In a beam-scale a locking mechanism comprising the coin-controlled dog and its shifting weight in combination with mechanism for operating the beam slide-weight.

15. In a beam-scale the coin-controlled dog in combination with the beam and its slide-weight; and mechanism controlled by said dog for automatically moving said slide-weight.

16. In a beam-scale the coin-controlled dog in combination with the beam and its slide-weight; mechanism controlled by said dog for automatically moving said slide-weight and two projections on said beam respectively actuating said dog at determined points in the movement of said beam.

17. In a beam-scale a coin-controlled slide-weight-actuating mechanism and beam-operated devices for releasing said mechanism when the beam-scale arm is below the horizontal and locking it during the upward movement of said arm.

18. In a beam-scale a coin-controlled slide-weight-actuating mechanism and beam-operated devices for releasing said mechanism when the beam-scale arm is below the horizontal, locking it during the upward movement of said arm and unlocking it as said arm attains the horizontal.

19. In a beam-scale a coin-controlled mechanism for automatically moving the slide-weight on said beam and a platform-actuated mechanism for holding said first mechanism until weight is applied to said platform and returning it when said weight is removed from the platform.

20. In a beam-scale, the beam and its slide-weight in combination with the coin-controlled rack and mechanism connecting it with said slide; and the platform-actuated arm engaging said rack, all being arranged to operate substantially as specified.

21. In a machine of the class specified the dog and its shifting weight in combination with the coin-chute; the lever projecting into said chute and a connection between said lever and an arm of said dog.

22. In a device of the class described, the beam and its slide-weight in combination with the pulley on said beam; the pulley concentric with the beam-fulcrum; the cord connecting said pulleys and weight and coin-released devices for actuating said fulcrum-pulley.

23. In a device of the class described the coin-controlled pulley-actuating rack in combination with the platform-actuated rack operating to return said pulley-rack when weight is removed from said platform.

WILLIS H. JORDAN.

Witnesses:
MATTHEW M. BLUNT,
O. M. SHAW.